(12) United States Patent
Kim (10) Patent No.: US 10,404,169 B2
(45) Date of Patent: Sep. 3, 2019

(54) SYSTEM AND METHOD FOR EXTENDING THE MAXIMUM DUTY CYCLE OF A STEP-DOWN SWITCHING CONVERTER WITHOUT MAXIMUM DUTY CONTROL

(71) Applicant: Alpha and Omega Semiconductor Incorporated, Sunnyvale, CA (US)

(72) Inventor: Youngbok Kim, San Jose, CA (US)

(73) Assignee: ALPHA AND OMEGA SEMICONDUCTOR INCORPORATED, Sunnyvale, CA (US)

( * ) Notice: Subject to any disclaimer, the term of this patent is extended or adjusted under 35 U.S.C. 154(b) by 3 days.

(21) Appl. No.: 14/864,545

(22) Filed: Sep. 24, 2015

(65) Prior Publication Data

US 2017/0093281 A1    Mar. 30, 2017

(51) Int. Cl.
*H02M 3/158* (2006.01)
*H02M 3/156* (2006.01)
*H02M 1/00* (2006.01)

(52) U.S. Cl.
CPC ........... *H02M 3/158* (2013.01); *H02M 3/156* (2013.01); *H02M 2001/0009* (2013.01)

(58) Field of Classification Search
CPC ............ H02M 3/02; H02M 3/04; H02M 3/10; H02M 3/145; H02M 3/155; H02M 3/1563; H02M 3/157; H02M 3/1588; H02M 3/1582; H02M 3/158; H02M 3/156; H02M 3/33507; H02M 2001/0009; H02M 2001/0016; H02M 2001/0025; H02M 2001/0032; H02M 2001/0038; H02M 2001/0041; H02M 2003/1566; H02M 1/32; H02M 1/36; Y02B 70/1466; Y02B 70/1458; Y02B 70/16; H03K 4/06; H03K 4/08; H03K 4/085; H03K 4/48; H03K 4/50; H03K 7/00; H03K 7/08
USPC ................. 323/205–211, 222–226, 271–280, 323/282–288, 351; 363/21.1, 21.11, 363/21.18, 41, 42; 327/131–140, 142
See application file for complete search history.

(56) References Cited

U.S. PATENT DOCUMENTS

| 5,479,090 A | * | 12/1995 | Schultz | ..................... G05F 1/56 323/284 |
| 2007/0247131 A1 | * | 10/2007 | Sohma | .................. H02M 3/156 323/284 |

(Continued)

*Primary Examiner* — Gary L Laxton
*Assistant Examiner* — Carlos O Rivera-Perez
(74) *Attorney, Agent, or Firm* — Lance A. Li; Chein-Hwa Tsao; Chen-Chi Lin (57) ABSTRACT

The invention proposes a system and method for extending the maximum duty cycle of a step-down switching converter to nearly 100% while maintaining a constant switching frequency. The system includes a voltage mode or current mode step-down converter driven by a leading edge blanking (LEB) signal, which operates at the desired switching frequency. More particularly, the LEB signal is connected to a slope generator and/or a current sense network. In each switching cycle, the LEB signal forces the slope signal and/or current sense signal to reset, thereby achieving a constant switching frequency. Corresponding methods for how to extend the maximum duty cycle of a step-down switching converter while maintaining a constant frequency are also disclosed.

10 Claims, 9 Drawing Sheets

(56) References Cited

U.S. PATENT DOCUMENTS

| | | | | |
|---|---|---|---|---|
| 2008/0129265 A1* | 6/2008 | Rosenthal | ............ | H02M 3/156 |
| | | | | 323/283 |
| 2009/0080227 A1* | 3/2009 | Nakahashi | ............ | H02M 3/156 |
| | | | | 363/80 |
| 2010/0245323 A1* | 9/2010 | Chia | ................ | H02M 3/33507 |
| | | | | 345/211 |
| 2013/0057323 A1* | 3/2013 | Spini | ................ | H02M 3/33507 |
| | | | | 327/142 |

\* cited by examiner

SYSTEM AND METHOD FOR EXTENDING THE MAXIMUM DUTY CYCLE OF A STEP-DOWN SWITCHING CONVERTER WITHOUT MAXIMUM DUTY CONTROL

FIELD OF INVENTION

This invention generally relates to power from power supply or regulation systems. More specifically, the present invention relates to the system and method for maximizing duty and maintaining constant switching frequency without the use of maximum duty control circuitry.

BACKGROUND

Figure 1:
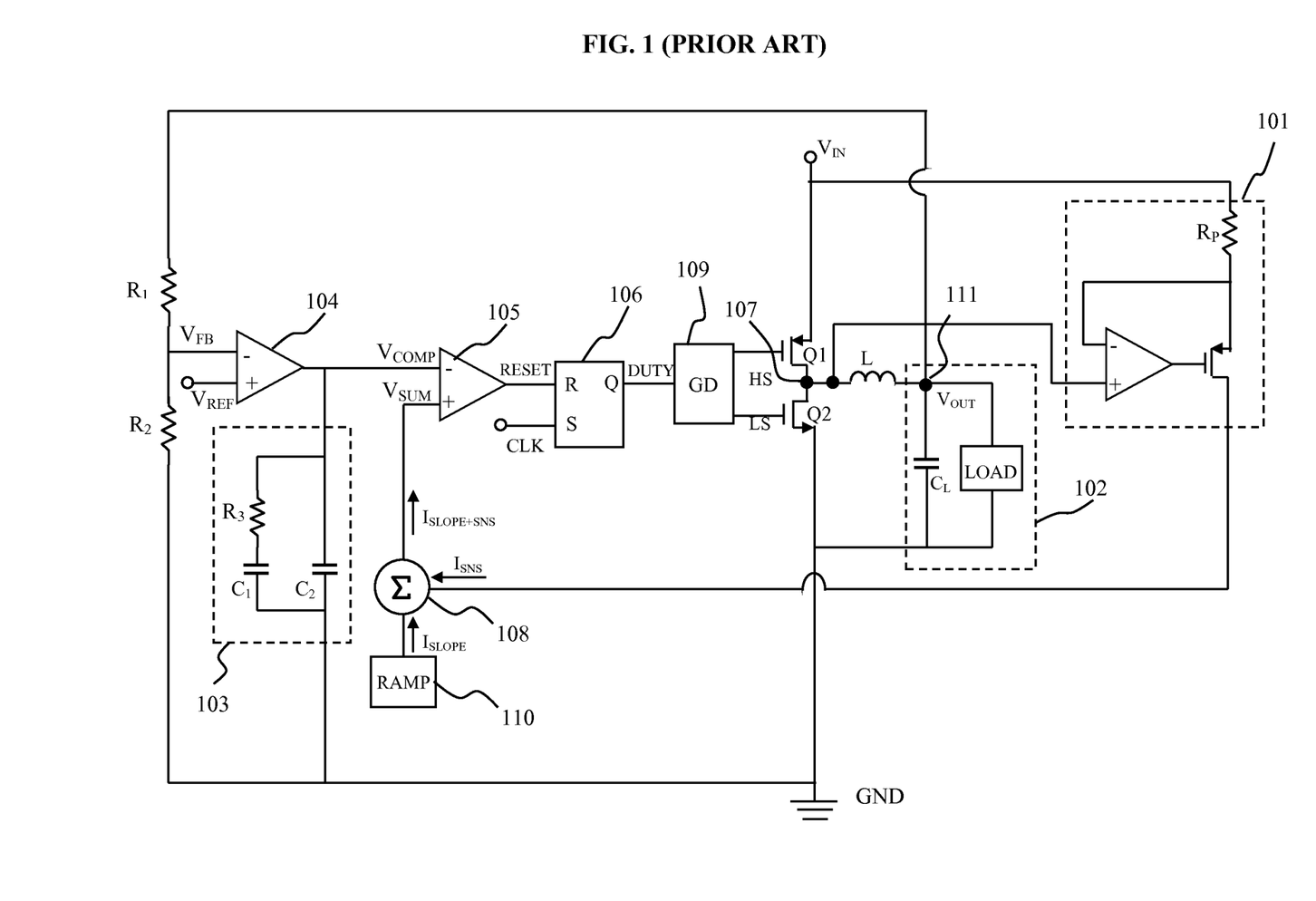
FIG. 1 is a block diagram of a prior art step-down switching converter.

A switching converter regulates power supplied to a load by modulating the duty ratio of a power switch that connects the power from a source to the load. The circuit diagram of a prior art step-down switching converter circuit without maximum duty control is depicted in FIG. 1. The prior art converter shown in FIG. 1 comprises a pair of switches Q1 and Q2 connected in series between an input voltage $V_{IN}$ and a ground node GND. A phase node 107 of switches Q1 and Q2 is simultaneously connected to a first end of an inductor L and to a current sense network 101, which generates a current signal $I_{SNS}$ indicative of the current through inductor L when the high-side switch Q1 is turned on. The current signal $I_{SNS}$ is then connected to a summation network 108 wherein $I_{SNS}$ is combined with a slope signal $I_{SLOPE}$ generated from a slope signal generator 110 to produce a combined current signal $I_{SLOPE+SNS}$. A second end of inductor L is connected to an output node 111 having an output voltage $V_{OUT}$. The output node is further connected to a load network 102 and a voltage divider formed by resistors R1 and R2. The voltage divider produces a feedback voltage $V_{FB}$ indicative of $V_{OUT}$. $V_{FB}$ and a reference voltage $V_{REF}$ are connected respectively to the inverting input and the noninverting input of an error amplifier 104. The error amplifier 104 compares $V_{FB}$ to $V_{REF}$ and amplifies their difference. A compensation network 103, such as a Type II network formed by passive elements R3, C1, and C2, is connected to the output of the error amplifier 104, thereby generating an error signal $V_{COMP}$. $V_{COMP}$ and a voltage signal $V_{SUM}$ indicative of $I_{SLOPE+SNS}$ are respectively connected to the inverting input and the noninverting input of a pulse width modulation ("PWM") comparator 105, which compares $V_{COMP}$ to $V_{SUM}$ and generates an output signal RESET. RESET and a clock signal CLK are respectively connected to the R input and the S input of a reset-dominant latch 106, which outputs a DUTY signal that is provided to a gate driver GD 109. The gate driver GD 109 generates HS and LS signals to control the switching frequency of switches Q1 and Q2, thereby achieving the regulation of power supplied to the load network 102.

Figure 2:
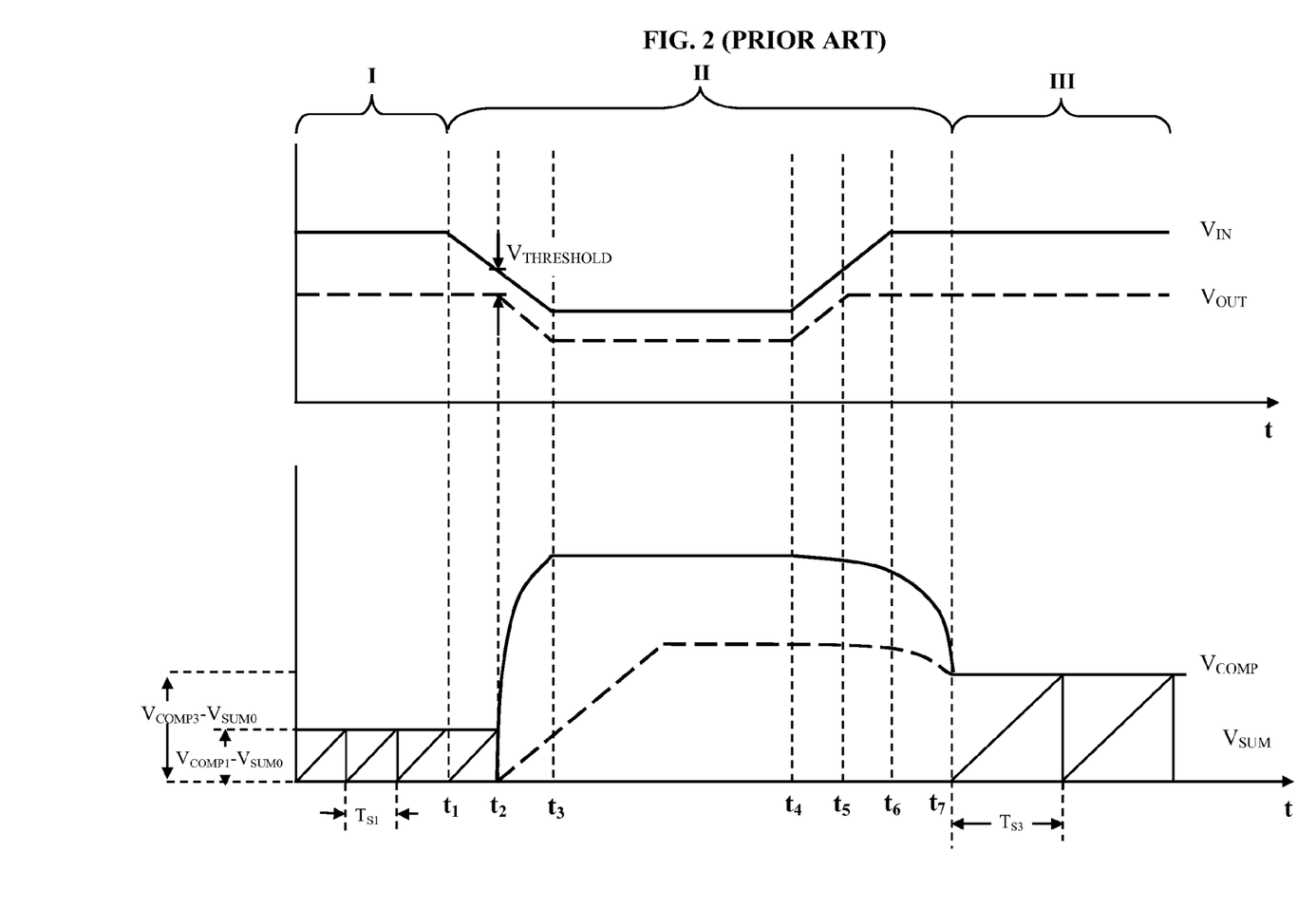
FIG. 2 is a waveform diagram of $V_{IN}$, $V_{OUT}$, $V_{COMP}$, and $V_{SUM}$ from the prior art step-down switching converter plotted versus time.

FIG. 2 is a waveform diagram for the prior art converter shown in FIG. 1 wherein the voltage of $V_{IN}$, $V_{OUT}$, $V_{COMP}$, and $V_{SUM}$ are plotted versus time. In each switching cycle, the control signal $V_{SUM}$ starts at a base voltage $V_{SUM0}$ at the base of the slope and increases at an approximately constant slew rate. As $V_{SUM}$ rises to the same voltage as $V_{COMP}$, which serves as a ceiling, $V_{SUM}$ resets to its initial voltage $V_{SUM0}$ and repeat the slope cycle. During a typical switching cycle, the relationship between the switching frequency, the slew rate of $V_{SUM}$, and $V_{COMP}$ is expressed in EQ. (1), wherein $F_S$ is the switching frequency, $T_S$ is the switching period, m is the slew rate, and $V_{SUM0}$ is the base voltage of $V_{SUM}$.

$$F_S = \frac{1}{T_S} = \frac{m}{(V_{COMP} - V_{SUM0})} \quad \text{EQ. (1)}$$

FIG. 2 is partitioned into three temporal phases to elucidate the problem encountered by the prior art converter when the input-output voltage differential (i.e., the difference between $V_{IN}$ and $V_{OUT}$) temporarily falls below the dropout voltage $V_{THRESHOLD}$. In Phase I, $V_{IN}$, $V_{OUT}$, and $V_{COMP}$ are in their respective steady state conditions when the input-output voltage differential is greater than the dropout voltage $V_{THRESHOLD}$. The switching frequency of the converter in Phase I can be characterized by EQ. (2), wherein $F_{S1}$, $T_{S1}$, and $V_{COMP1}$ are, respectively, the switching frequency, the switching period, and $V_{COMP}$ in Phase I. The voltage of slope signal $V_{SUM}$ starts from the base voltage $V_{SUM0}$, increases to $V_{COMP1}$, then resets back to $V_{SUM0}$. Operation in this manner repeats every $T_{S1}$ second and maintains a switching frequency of $F_{S1}$ until $V_{COMP}$ changes.

$$F_{S1} = \frac{1}{T_{S1}} = \frac{1}{\left(\frac{V_{COMP1} - V_{SUM0}}{m}\right)} = \frac{m}{V_{COMP1} - V_{SUM0}} \quad \text{EQ. (2)}$$

In Phase II, over the period from $t_1$ to $t_3$, $V_{IN}$ falls from the initial steady state voltage to below the target voltage for $V_{OUT}$. At time $t_2$, $V_{OUT}$ begins to decrease as the input-output voltage differential falls below the dropout voltage $V_{THRESHOLD}$. The drop in $V_{OUT}$ triggers a compensation response in which $V_{COMP}$ rises to increase $V_{OUT}$ to its initial target voltage. However, since $V_{OUT}$ cannot exceed $V_{IN}$, $V_{OUT}$ is prevented from attaining the target voltage when $V_{IN}$ is lower than the target voltage. While $V_{OUT}$ is lower than the target voltage, $V_{COMP}$ continues to increase until it saturates, at which point $V_{COMP}$ levels out. As previously mentioned, $V_{COMP}$ provides the upper threshold for triggering $V_{SUM}$ to reset; increasing $V_{COMP}$ causes $V_{SUM}$ to slope up unrestricted until it also saturates.

From time $t_4$ to $t_6$, $V_{IN}$ is gradually restored to its initial steady-state value. As $V_{IN}$ increases, the input-output voltage differential and $V_{OUT}$ also begin to increase. At $t_5$, the input-out voltage differential exceeds $V_{THRESHOLD}$, at which point $V_{OUT}$ is restored to its target voltage. In response to the increase in $V_{OUT}$, $V_{COMP}$ gradually decreases until a new steady-state value is achieved at time $t_7$. When $V_{COMP}$ decreases to the same voltage as $V_{SUM}$, the slope signal $V_{SUM}$ resets and resumes the aforementioned slope and reset cycle.

In Phase III, both $V_{IN}$ and $V_{OUT}$ are restored to their original steady-state voltage. $V_{COMP}$ levels out to a new steady-state voltage $V_{COMP3}$, which may be different from the initial steady-state voltage $V_{COMP1}$. The switching frequency of the converter in Phase III can be characterized by EQ. (3), wherein $F_{S3}$, $T_{S3}$, and $V_{COMP3}$ are, respectively, the switching frequency, the switching period, and $V_{COMP}$ in Phase III.

$$F_{S3} = \frac{1}{T_{S3}} = \frac{1}{\left(\frac{V_{COMP3} - V_{SUM0}}{m}\right)} = \frac{m}{V_{COMP3} - V_{SUM0}} \quad \text{EQ. (3)}$$

Since the slew rate of $V_{SUM}$ is approximately constant and $V_{COMP}$ provides the upper threshold for triggering $V_{SUM}$ to reset the slope cycle, the duration of each slope cycle depends on the difference between $V_{COMP}$ and $V_{SUM0}$. The greater the difference between $V_{COMP}$ and $V_{SUM0}$, the longer $V_{SUM}$ would take to reach the $V_{COMP}$ threshold. It was previously introduced in EQ. (1) that the switching period $T_S$ is the inverse of the switching frequency $F_S$. When a change in Wow causes the switching period $T_S$ to change, the switching frequency $F_S$ also changes. By way of example, assume that $V_{SUM0}$ is 0 and that $V_{COMP3}=2V_{COMP1}$; then the relationship between the switching frequencies $F_{S1}$ and $F_{S3}$, can be derived by algebraic manipulation of EQs. (2) through (5). Substituting EQs. (2) and (4) into EQ. (6), it is determined that the switching frequency is reduced by half when $V_{COMP}$ is doubled.

$$V_{SUM0} = 0 \qquad \text{EQ. (4)}$$

$$V_{COMP3} = 2V_{COMP1} \qquad \text{EQ. (5)}$$

$$F_{S3} = \frac{m}{V_{COMP3}} = \frac{m}{2V_{COMP1}} = \frac{1}{2}F_{S1} \qquad \text{EQ. (6)}$$

The above example demonstrates that the switching frequency of the prior art converter is dependent on $V_{COMP}$. The tendency for the switching frequency to drift after the circuit experiences a temporary anomalous decrease in the input voltage renders this prior art converter unsuitable for applications where the maintenance of a constant switching frequency is desirable or even essential.

BRIEF SUMMARY OF THE INVENTION

In view of the above, the present invention provides a system and method for extending the maximum duty cycle of a step-down switching converter to nearly 100% while maintaining a constant switching frequency. The system includes a voltage mode or current mode step-down converter driven by a leading edge blanking (LEB) signal, which operates at the desired switching frequency. More specifically, the LEB signal is connected to a slope generator and/or a current sense network. In each switching cycle, the LEB signal forces the slope signal and/or current sense signal to reset, thereby achieving a constant switching. Corresponding methods for how the system operates is also described.

BRIEF DESCRIPTION OF THE DRAWINGS

The above and other objects, features and advantages of the present disclosure will become more apparent from the following detailed description made with reference to the accompanying drawings. In the drawings.

Like reference numbers and designations in the various drawings indicate like elements.

DETAILED DESCRIPTION OF THE EMBODIMENTS

Various features of the embodiments of the present invention are herein described in detail with reference to the drawings, where like reference numbers represent like elements throughout the several views. The drawings are not necessarily drawn to scale, and in some cases have been exaggerated and/or simplified for illustrative purposes only. Reference to a particular embodiment does not limit the scope of the present invention. One of ordinary skill in the art will appreciate the many possible applications and variations based on the general principles defined herein and that may be applied to other embodiments. The present invention is to be accorded the widest scope consistent with the principles and novel features herein disclosed.

Figure 3A:
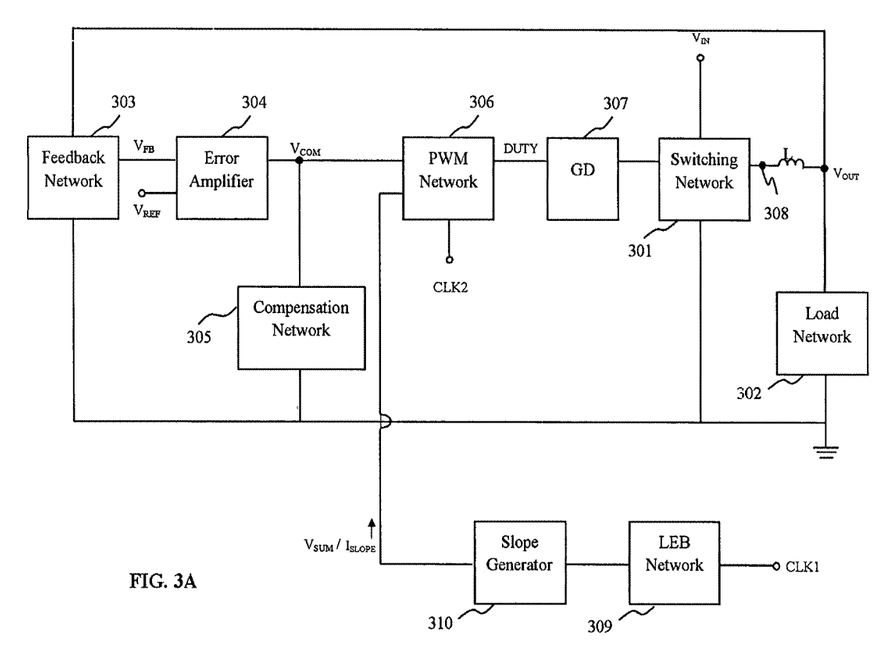
FIG. 3A is a simplified block diagram of a first embodiment of the present invention.

Referring to FIG. 3A, a block diagram of a first embodiment of the present invention is disclosed. The first embodiment comprises a timing element-driven LEB network 309 connected to a voltage-mode step-down switching converter. According to this embodiment, an input voltage $V_{IN}$ is connected to a switch network 301, which is further connected to a ground node GND. A phase node 308 in the switch network 301 is connected to a load network 302 via inductor L. An output voltage $V_{OUT}$ measured across the load network 302 is provided to a feedback network 303, which generates a feedback signal $V_{FB}$ indicative of the output voltage. The feedback signal $V_{FB}$ and a reference signal $V_{REF}$ indicative of a target voltage of $V_{OUT}$ are provided to an error amplifier 304. The error amplifier 304 produces an output signal $V_{COMP}$, which is connected to and stabilized by a compensation network 305. A timing element CLK1 provides a constant frequency clock signal to the LEB network 309 representing the desired switching frequency. The LEB network 309 then produces an LEB signal and an RSTB signal based on the LEB signal. The RSTB signal is active low and is the inverse of the LEB signal. A slope signal generator 310, which produces a slope signal $I_{SLOPE}$, receives and uses the RSTB signal to reset the slope signal $I_{SLOPE}$ at the frequency of CLK1. $V_{COMP}$, $I_{SLOPE}$, and a timing signal CLK2 are provided to a PWM network 306, which generates a DUTY signal. A gate driver GD 307 then receives the DUTY signal and generates one or more control signals to control the on/off duration of switches within the switch network 301, through which the power delivered to the load network 302 is modulated.

Figure 3B:
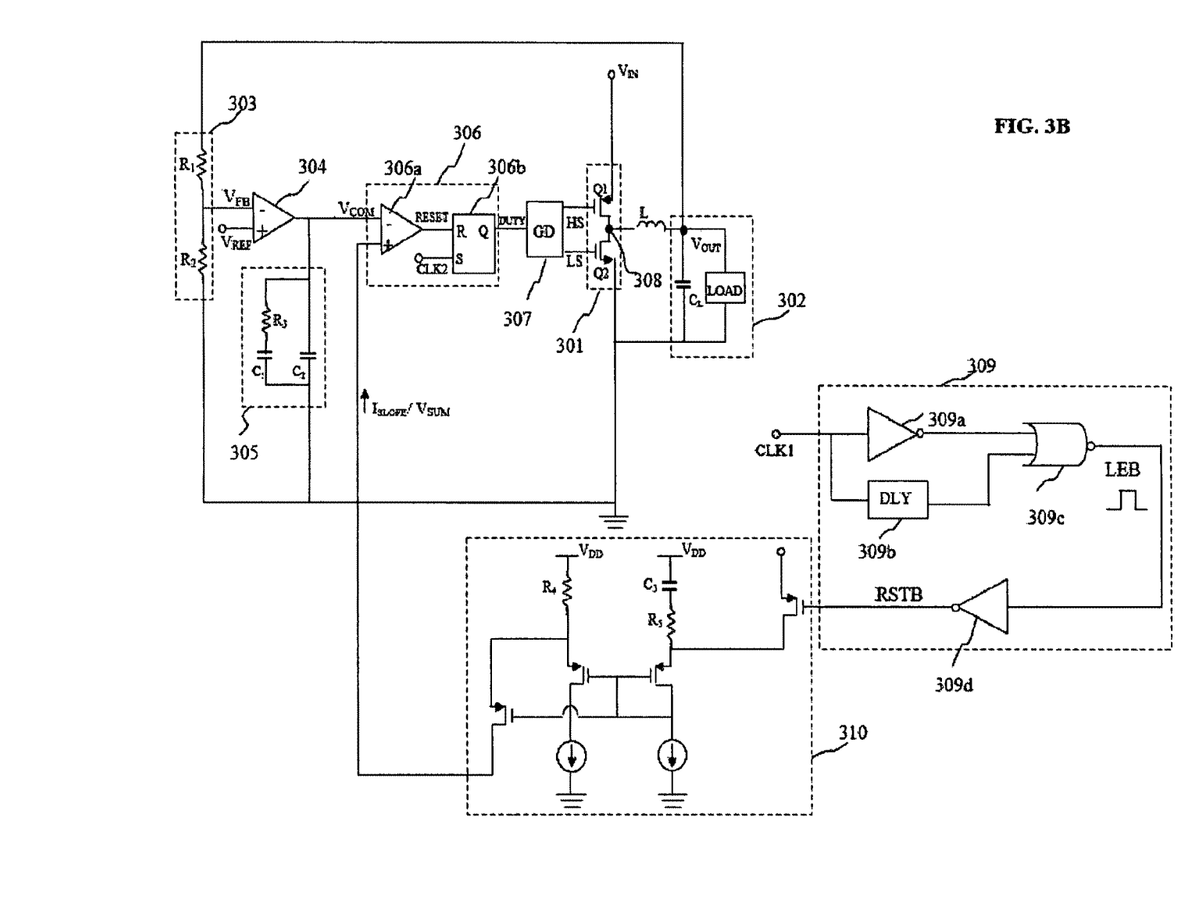
FIG. 3B is a detailed circuit diagram of a circuit according to the first embodiment of the present invention.

The circuit diagram in FIG. 3B is a circuit using the configuration described in the first embodiment of the present invention. A clock signal CLK1 from a timing element is provided to the LEB network 309. The LEB network 309 comprises a first inverter 309a, a delay network DLY 309b, a NOR gate 309c, and a second inverter 309d. The CLK1 signal representing the desired switching frequency is provided to both the first inverter 309a and DLY 309b. The output of the first inverter 309a and the output of DLY 309b are respectively connected to the first and the second input of the NOR gate 309c, which produces an LEB signal. In a given cycle, the LEB signal starts in the high-state, then switches to the low-state, then rises back to the high-state at the end of the cycle. The duration that the LEB signal remains in the high-state depends on the design parameters of the delay network DLY. The LEB signal is then provided to the second inverter 309d, which inverts the LEB signal to produce the RSTB signal. In a given cycle, the RSTB signal begins in the low-state, rises to the high-state, and then returns to the low-state. The duration of the signal in the low-state at the beginning of each cycle is the blanking duration. The slope signal generator 310 receives the RSTB signal and is further connected to a PWM comparator 306a. Using the blanking duration, the RSTB signal resets the slope signal generator 310 at the beginning of each cycle. The slope signal generator 310 provides a slope signal $I_{SLOPE}$ to the PWM network 305.

In the step-down converter, $V_{IN}$ is connected to a switch network 301 comprising a pair of serially-connected switches Q1 and Q2, which are further connected to the ground node GND. The phase node 308 between switches Q1 and Q2 is connected to the load network 302 via the inductor L. $V_{OUT}$ measured across the load network 302 is provided to a feedback network 303, which is connected between $V_{OUT}$ and GND. The feedback network 303, comprising a pair of serially-connected voltage dividing resistors R1 and R2, is connected between $V_{OUT}$ and GND. A feedback signal $V_{FB}$ indicative of $V_{OUT}$, taken from the node between resistors R1 and R2, is provided to an error amplifier 304. $V_{FB}$ and a reference signal $V_{REF}$ indicative of a target voltage of $V_{OUT}$ are connected to the inverting input and the noninverting input of the error amplifier 304, respectively. The error amplifier 304 produces an output signal $V_{COMP}$, which is connected to and stabilized by a compensation network 305. In this example, a Type II network formed by passive elements R3, C1, and C2, is used. The slope signal $I_{SLOPE}$ generated by the slope signal generator 310, $V_{COMP}$, and a timing signal CLK2, are provided to a PWM network 306 to generate a DUTY signal. In this circuit, the PWM network 306 comprises a PWM comparator 306a and a reset-dominant latch 306b. A voltage signal $V_{SUM}$ corresponding to the slope signal $I_{SLOPE}$ is provided. $V_{COMP}$ and $V_{SUM}$ are respectively provided to the inverting input and the noninverting input of a PWM comparator 306a, whereby a RESET signal is produced. RESET signal and CLK2 are respectively provided to the R and S inputs of the reset-dominant latch 306b, whereby a DUTY signal is produced. DUTY is provided to a gate driver GD 307, which produces an HS signal and an LS signals to control switches Q1 and Q2, respectively, thereby modulating the power delivered to the load network 302.

Figure 4A:
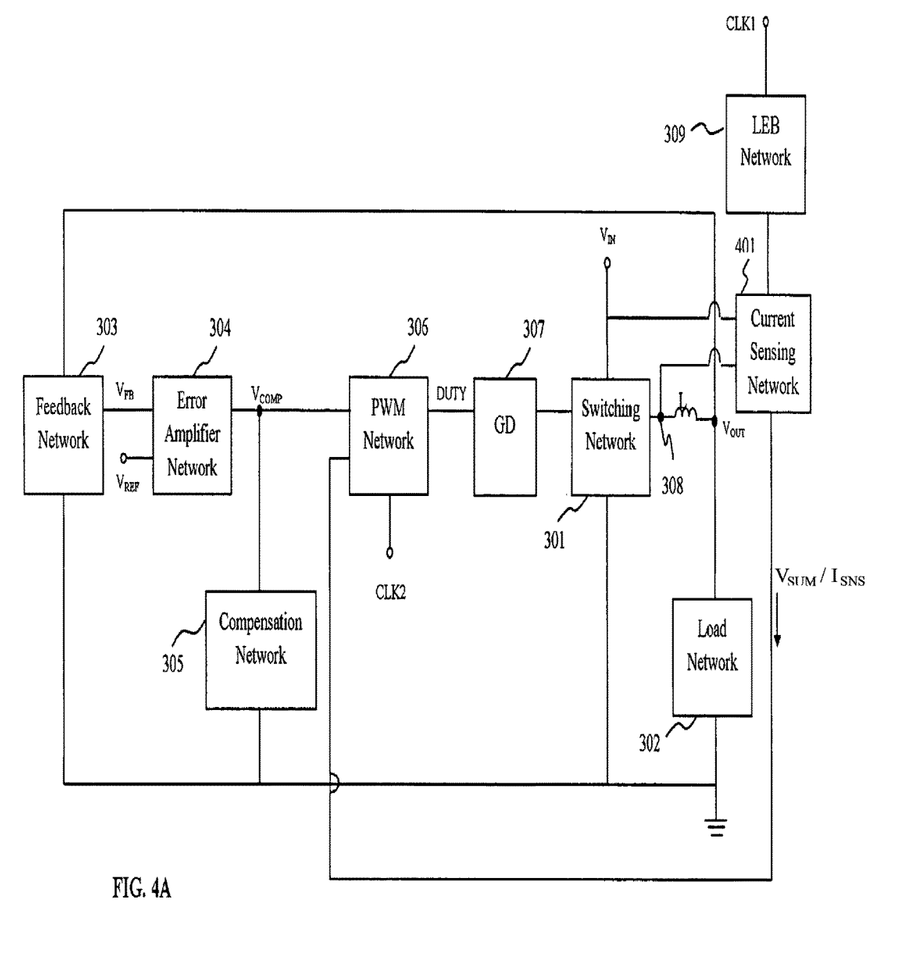
FIG. 4A is a simplified block diagram of a second embodiment of the present invention.

The block diagram in FIG. 4A discloses a second embodiment of the present invention. This embodiment comprises a timing element-driven LEB network 309 connected to a current-mode step-down switching converter. According to this embodiment of the invention, a current sense network 401 detects the current through inductor L when the high-side switch Q1 is turned "on", and then feedbacks a current sense signal $I_{SNS}$ to the PWM network to adjust the power modulation accordingly. Referring to FIG. 4A, an input voltage V $I_N$ is connected to a switch network 301, which is further connected to a ground node GND. A phase node 308 in the switch network 301 is connected to a load network 302 via inductor L. The current sense network 401 connects to the $V_{IN}$ node and the phase node 308 to generate the current sense signal $I_{SNS}$. An output voltage $V_{OUT}$ measured across the load network 302 is provided to a feedback network 303, which generates a feedback signal $V_{FB}$ indicative of the output voltage. The feedback signal $V_{FB}$ and a reference signal $V_{REF}$ indicative of a target voltage of $V_{OUT}$ are provided to an error amplifier 304. The error amplifier 304 produces an output signal $V_{COMP}$, which is connected to and stabilized by a compensation network 305. A timing element CLK1 provides a constant frequency clock signal to the LEB network representing the desired switching frequency. The LEB network 309 provides to the current sense network an RSTB signal, which is used to reset the current sense signal $I_{SNS}$ according to the frequency of CLK1. $V_{COMP}$, $I_{SNS}$, and a timing signal CLK2 are provided to a PWM network 306, which generates a DUTY signal. A gate driver GD 307 receives DUTY and generates one or more control signals to control the on/off duration of the switch network 301, whereby the power delivered to the load network 302 is modulated.

Figure 4B:
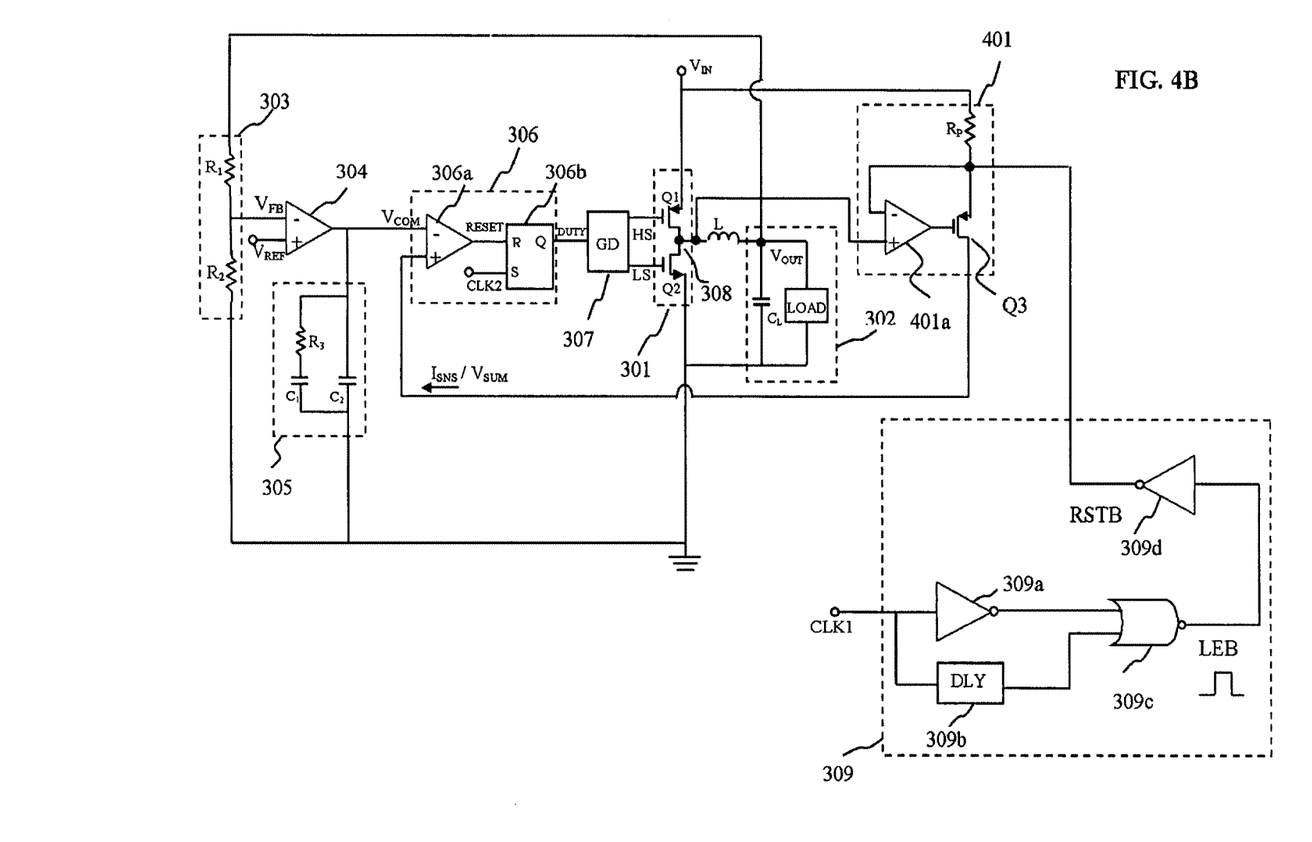
FIG. 4B is a detailed circuit diagram of a circuit according to the second embodiment of the present invention.

The circuit diagram in FIG. 4B shows a circuit according to the second embodiment of the present invention. The current mode converter is similar to the voltage mode converter described in FIG. 3B except for several key distinctions. First, the slope signal generator is replaced with a current sense network 401. The current sense network 401 comprises a resistor $R_P$, a comparator 401a, and a switch Q3. $V_{IN}$ is connected to a first end of $R_P$, while the second end of $R_P$ is connected to both the source terminal of switch Q3 and to the inverting input of comparator 401a. The output of the comparator 401a is provided to the gate terminal of switch Q3. The drain terminal generates and provides to the PWM comparator 306a a current sense signal $I_{SNS}$ indicative of the inductor current. Second, the RSTB reset signal is provided to a node connected to the inverting input of the comparator 401a and the source of switch Q3. The RSTB signal resets $I_{SNS}$ at a frequency determined by CLK1.

Figure 5A:
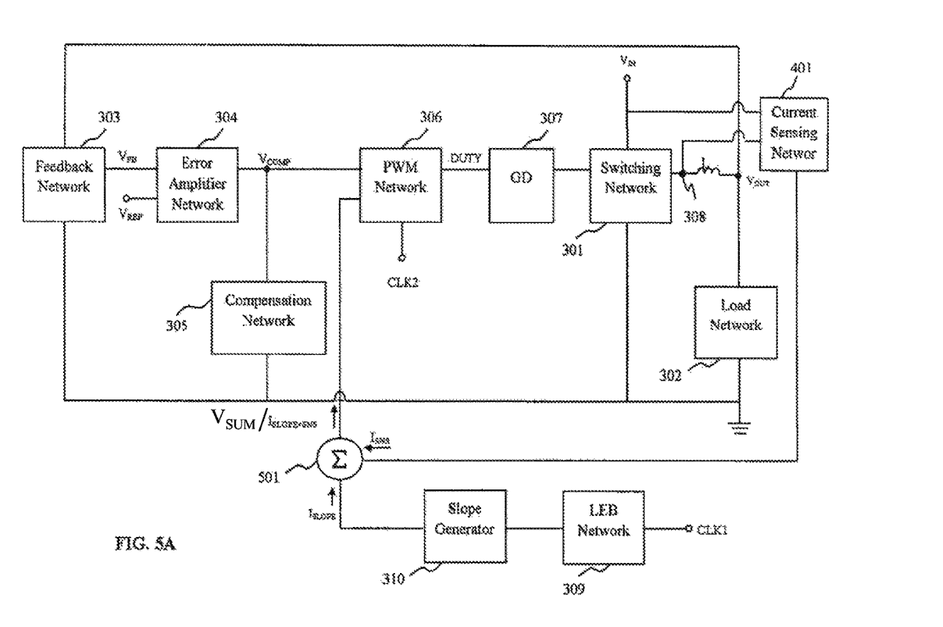
FIG. 5A is a simplified block diagram of a third embodiment of the present invention.

FIG. 5A discloses a third embodiment of the present invention, in which the LEB network is connected to a hybrid current mode step-down switching converter, which comprises both a current sense network 401 and a slope signal generator 310. The slope signal $I_{SLOPE}$ and the current sense signal $I_{SNS}$ are provided to an adder 501 wherein both signals are summed to produce a sum signal $I_{SLOPE+SNS}$. A voltage signal $V_{SUM}$, which corresponds to $I_{SLOPE+SNS}$, is provided to the inverting input of the PWM comparator 306a for comparison with $V_{COMP}$.

Figure 5B:
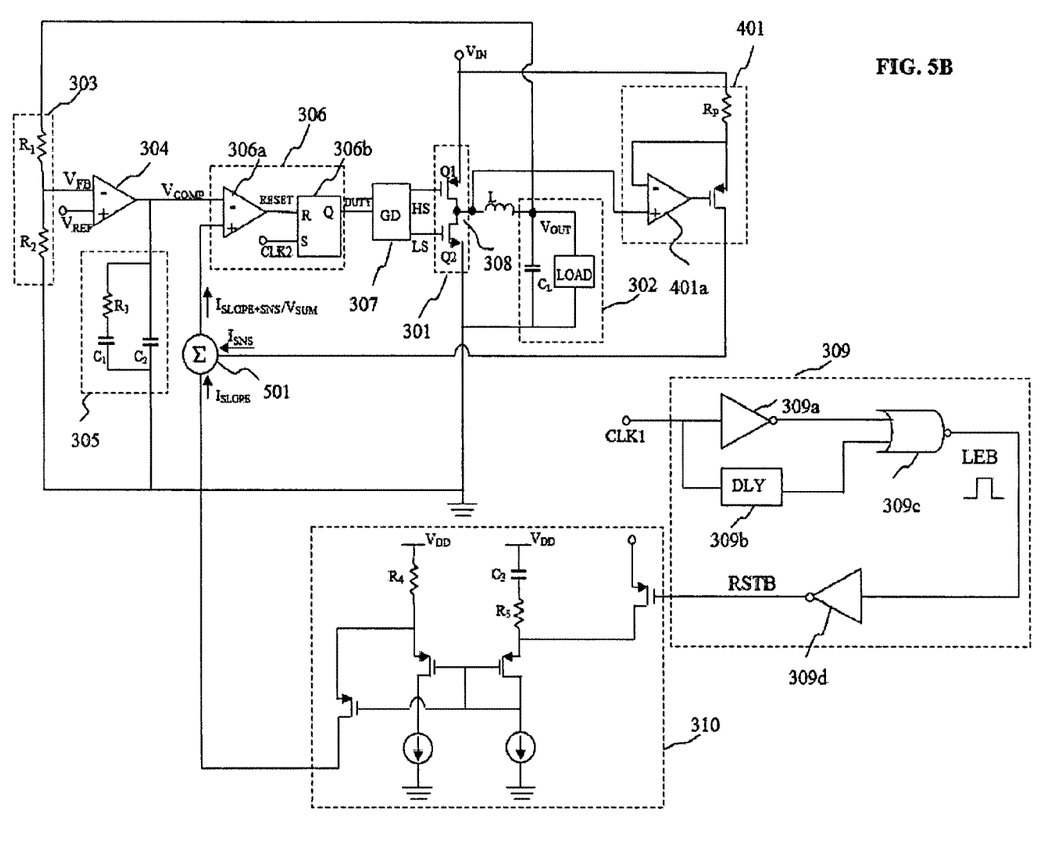
FIG. 5B is a detailed circuit diagram of a circuit according to the third embodiment of the present invention.

The circuit diagram in FIG. 5B shows a circuit according to the third embodiment of the present invention. This circuit combines elements from both the first and the second embodiments.

First, the timing element CLK1, the LEB network, and the slope signal generator 310 are provided according to the configuration of FIG. 3B with the exception of the connection of between the slope signal generator 310 and the PWM comparator 306a. The current signal $I_{SLOPE}$ is provided to an adder 501.

Second, a current sense network is provided according to the configuration of FIG. 4B. The input voltage $V_{IN}$ is connected to the first end of $R_P$, while the second end of $R_P$ is connected to both the source terminal of switch Q3 and to the inverting input of comparator 401a. The output of the comparator 401a is provided to the gate terminal of switch Q3. The drain terminal generates and provides to the adder 501 a current sense signal $I_{SNS}$ indicative of the inductor current.

Third, the adder 501 combines the slope signal $I_{SLOPE}$ with the current sense signal $I_{SNS}$ to produce a sum signal $I_{SLOPE+SNS}$, which is further converted into a corresponding voltage signal $V_{SUM}$. The signal $V_{SUM}$ is provided to the noninverting input of the PWM comparator 306a, wherein $V_{SUM}$ is compared with $V_{COMP}$. The PWM comparator 306a provides a RESET signal to the R input of the reset-dominant latch 306b while a timing element provides a timing signal CLK2 to the S input. The latch 306b generates and provides to the gate driver 307 a DUTY signal. The rest of the elements, including the switch network 301, the load network 302, the feedback network 303, the error amplifier 304, the compensation network 305, and the gate driver GD 307 are configured in the same way as the circuits shown in FIGS. 3B and 4B

The above-described embodiments are only examples of the present invention, which is in essence to use an LEB network to reset the slope signal and/or the current sense signal at a preset frequency so that the switching frequency of the converter is maintained constant. Other embodiments of the present invention will be readily apparent to a person having ordinary skill in the art upon reading the above description. A non-exhaustive list of some other variations is described below.

Each embodiment of the present invention may be modified to use a different configuration for the gate driver GD 307 and the switch network 301. For instance, the low-side switch Q2 may be replaced with a passive rectifier, such as a Schottky diode. Gate driver GD 307 would then provide only an HS signal to control the high-side switch Q1. Each embodiment may be further modified to use a set-dominant latch instead of a reset-dominant latch. Yet another variation of the embodiments is to synchronize CLK1 and CLK2 or replaces both timing elements with a single timing element so that the LEB network and the PWM network are synchronized and have the same frequency.

Figure 6:
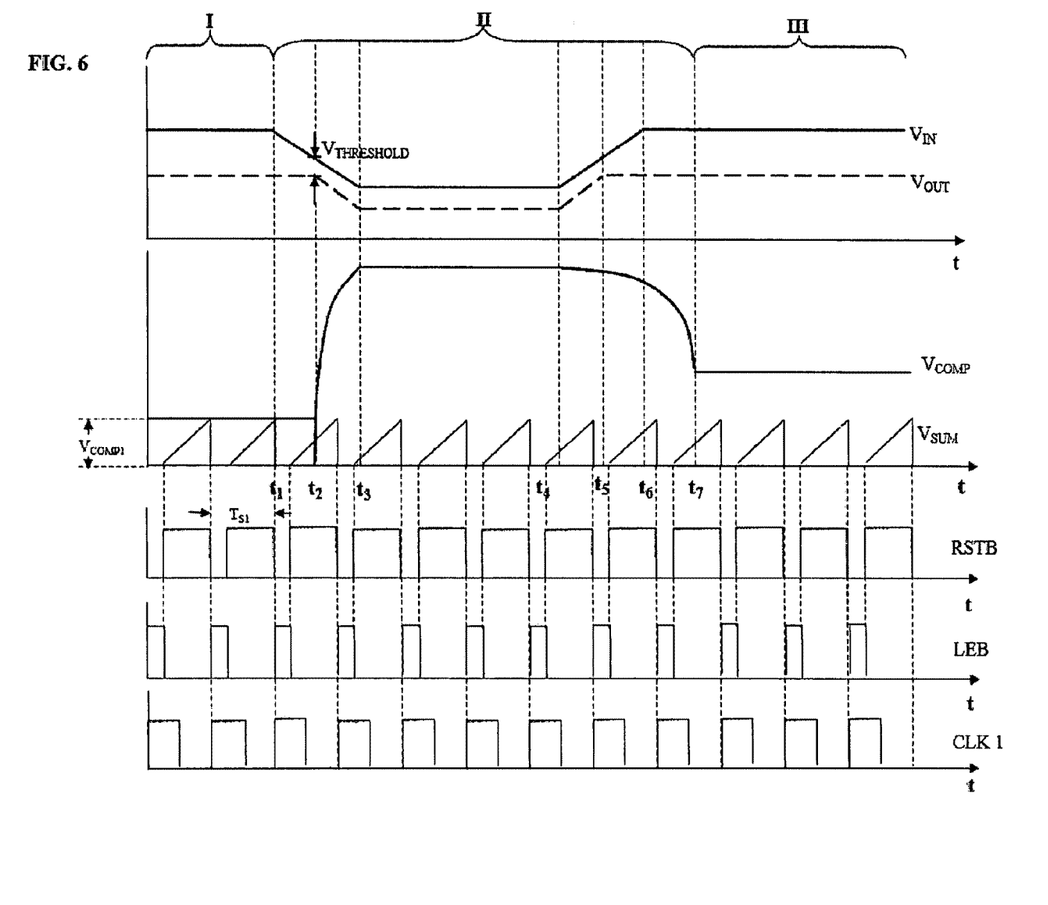
FIG. 6 illustrates a number of waveforms associated with the operation of the step-down switching converter of the present invention.

FIG. 6 illustrates a number of waveforms associated with the operation of the step-down converters disclosed in the above paragraphs. The waveforms are merely intended to conceptually represent the type of response that can be expected from a system built according to the descriptions of the present invention; however, actual performance may vary. The waveforms shown are the signals for $V_{IN}$, $V_{OUT}$, $V_{COMP}$, $V_{SUM}$, RSTB, LEB, and CLK1. For better comparison with the prior art waveform shown in FIG. 2, the waveforms for $V_{IN}$, $V_{OUT}$, and $V_{COMP}$ are kept the same. As shown, CLK1 is preset to operate at a desired switching frequency $F_{S1}$. The LEB network 309, the slope signal generator 310, and/or the current sense network 401 are directly or indirectly driven by CLK1 to operate at the same frequency (i.e., the desired switching frequency). Since $V_{SUM}$ is the voltage corresponding to the signal $I_{SLOPE}$, $I_{SNS}$, Or $I_{SLOPE+SNS}$, the periodic reset of the slope signal generator 310 also causes $V_{SUM}$ to reset at the desired switching frequency $F_{S1}$. In Phase II of FIG. 6, the input-output differential falls below the threshold voltage at time $t_2$, thereby causing $V_{OUT}$ to drop below the target voltage. In response, $V_{COMP}$ rises to compensate for the decrease. In contrast to the prior art scenario shown in FIG. 2, $V_{SUM}$ in the present invention no longer relies on $V_{COMP}$ for providing the ceiling signal to reset $V_{SUM}$. Instead, $V_{SUM}$ independently and continuously resets at the target switching frequency $F_{S1}$ notwithstanding the input-output voltage differential temporarily falling below the threshold voltage.

The present invention also describes methods for extending the maximum duty cycle of a step-down switching converter while maintaining a constant frequency using the above described embodiments. Corresponding to the voltage mode switching converter described in the first embodiment, the first method entails the following steps:

STEP 1 providing an RSTB signal operating at a desired switching frequency;

STEP 2A providing a slope signal $I_{SLOPE}$;

STEP 3A periodically resetting the slope signal $I_{SLOPE}$ at the desired switching frequency using the RSTB signal;

STEP 4 providing a switch network 301 configured to connect an input node having an input voltage $V_{IN}$ to inductor L, which is further connected to an output node having an output voltage $V_{OUT}$, the switch network 301 comprises (1) a high-side switch Q1 connected between the input node and a phase node 308 having a phase node voltage, and (2) a low-side element connected between the phase node 308 and ground;

STEP 5 generating an error voltage $V_{COMP}$ based on comparison of a feedback voltage $V_{FB}$ signal indicative of the output voltage $V_{OUT}$ with a reference voltage $V_{REF}$;

STEP 6A generating a DUTY signal based on the error voltage $V_{COMP}$, a sum signal $V_{SUM}$ indicative of the slope signal $I_{SLOPE}$, and a second clock signal CLK2;

STEP 7 generating one or more control signals for controlling the switch network 301 based on the DUTY signal; and STEP 8 modulating the power delivered from the input node to the output node by controlling the switch network 301 with the one or more control signals.

According to the second embodiment of present invention, which described a current mode switching converter (see FIG. 4A), a current sense network 401 produces a signal indicative of the current through inductor L when the high-side switch Q1 is turned on. The second embodiment uses the same method as the first embodiment with the exception of STEPs 2A, 3A, and 6A, which are replaced with STEPs 2B, 3B, and 6B, respectively:

STEP 2B providing a current sense signal $I_{SNS}$ indicative of the current through inductor L when the high-side switch Q1 is turned on;

STEP 3B periodically resetting the current sense signal $I_{SNS}$ at the desired switching frequency using the RSTB signal; and STEP 6B generating a DUTY signal based on $V_{COMP}$, $I_{SNS}$, and CLK2.

The third embodiment of the present invention described a system wherein the switching converter includes both the slope generator 310 and the current network 401. The method for the third embodiment uses the same steps as the method for the first embodiment, except for that STEP 2A is replaced with 2C-a and 2C-b, and STEP 6A is replaced with 6C.

STEP 2C-a providing an $I_{SNS}$ signal indicative of the current through inductor L when the high-side switch Q1 is turned on;

STEP 2C-b generating a signal $V_{SUM}$ indicative of the sum of $I_{SNS}$ and $I_{SLOPE}$, directly or indirectly, by summing $I_{SNS}$, and $I_{SLOPE}$; and STEP 6C generating a DUTY signal based on $V_{COMP}$, $V_{SUM}$, and CLK2.

With respect to STEP 1, the following steps describe one method for producing the RSTB signal.

STEP 1-a providing a first clock signal CLK1 having a desired switching frequency;

STEP 1-b inverting the first clock signal CLK1 to generate an inverted first clock signal;

STEP 1-c delaying the first clock signal CLK1 to generate a delayed first clock signal;

STEP 1-d inputting the inverted first clock signal and the delayed first clock signal into a NOR gate to generate an LEB signal; and STEP 1-e inverting the LEB signal to generate the RSTB signal operating at the desired switching frequency.

Various embodiments and variations of the present invention have been described. While the above descriptions of the various embodiments and variations of the present invention contain many details, these should not be construed as limitations on the scope of any inventions or of what may be claimed, but rather as descriptions of embodiments specific to particular embodiments of the invention. Certain features that are described in this specification in the context of separate embodiments can also be implemented in combination in a single embodiment. Conversely, various features that are described in the context of a single embodiment can also be implemented in multiple embodiments. In addition, the methods described herein do not necessarily require the particular order shown, or sequential order, to achieve the desired results. In certain cases, the steps may also be performed simultaneously.

The invention claimed is:

1. A step-down switching converter system for extending a maximum duty cycle of a stepdown switching converter without maximum duty control comprising:
   a leading edge blanking ("LEB") network configured to generate a reset bar (RSTB) signal for resetting a slope signal based on a first clock signal operating at a desired switching frequency;
   a slope signal generator, connected to the LEB network, configured to generate the slope signal which resets periodically at the desired switching frequency based the RSTB signal;
   a switch network configured to connect an input node having an input voltage to an inductor, which is further connected to an output node having an output voltage, the switch network comprises a high-side switch connected between the input node and a phase node having a phase node voltage, and a low-side element connected between the phase node and ground;
   a feedback network, connected to the output node, configured to generate a feedback voltage signal indicative of the output voltage;
   an error amplifier, connected to the feedback voltage signal, configured to generate an error signal based on comparison of the feedback voltage signal to a reference voltage;
   a pulse width modulation ("PWM") network, connected to the error amplifier, configured to generate a duty signal based on the error signal, a second clock signal, and a sum signal indicative of the slope signal;
   a gate driver, connected to the PWM network, configured to generate one or more control signals for controlling the switch network based on the duty signal;
   a current sense network, directly connected to the input node and the phase node, configured to generate a current sense signal indicative of the current through the inductor when the high-side switch is turned on, and an adder configured to generate the sum signal by summing the current sense signal and the slope signal, wherein the sum signal resets to a base voltage for a predetermined period of time during a blanking duration of the RSTB signal.

2. The step-down switching converter of claim 1, wherein the LEB network comprises:
   a first inverter connected to receive the first clock signal, the first inverter generates an inverted first clock signal;
   a delay network connected to the first clock signal, the delay network configured to generate a delayed first clock signal;
   a NOR gate connected to receive the inverted first clock signal and the delayed first clock signal, whereby an intermediate LEB signal is generated; and
   a second inverter connected to receive the intermediate LEB signal, the second inverter generates the RSTB signal.

3. The step-down switching converter of claim 1, wherein the PWM network comprises:
   a PWM comparator, connected to receive the error signal to an inverting input and the sum signal to a noninverting input of the PWM comparator, the PWM comparator configured to generate a PWM comparator output signal based on a difference between the error signal and the sum signal; and
   a latch, connected to receive the output signal of the PWM comparator and the second clock signal, the latch configured to generate an output of the duty signal.

4. The step-down switching converter of claim 3, wherein the first clock signal and the second clock signal are synchronized.

5. The step-down switching converter of claim 1, wherein the low-side element comprises a low-side switch.

6. The step-down switching converter of claim 1, wherein the current sense network comprises:
   a resistor $R_P$ having a first end connected to the input node;
   a current sense comparator having:
      a noninverting input connected to the phase node;
      an inverting input connected to a second end of the resistor $R_P$ and a source terminal of a current sense transistor; and
      an output of the current sense comparator connected to a gate terminal of the current sense transistor; and
   a drain terminal of the current sense transistor generates the current sense signal.

7. The step-down switching converter of claim 1 further comprising a compensation network connected between the output node of the error amplifier and ground.

8. A method for extending a maximum duty cycle of a step-down switching converter without maximum duty control comprising:
   providing a reset bar (RSTB) signal through a leading edge blanking ("LEB") network based on a first clock signal operating at a desired switching frequency;
   providing a slope signal; periodically resetting the slope signal at the desired switching frequency using the RSTB signal;
   providing a switch network configured to connect an input node having an input voltage to an inductor, which is further connected to an output node having an output voltage, the switch network comprises a high-side switch connected between the input node and a phase node having a phase node voltage, and a low-side element connected between the phase node and ground;
   generating an error voltage based on comparison of a feedback voltage signal indicative of the output voltage and a reference voltage;
   generating a duty signal based on the error voltage, a sum signal indicative of the slope signal, and a second clock signal;
   generating one or more control signals for controlling the switch network based on the duty signal;

modulating power delivered from the input node to the output node by controlling the switch network with the one or more control signals generated from a gate driver;

providing a current sense signal indicative of the current through the inductor when the high-side switch is turned on;

generating the sum signal, directly or indirectly, by summing the current sense signal and the slope signal;

wherein the sum signal resets to a base voltage for a predetermined period of time during a blanking duration of the RSTB signal;

and wherein a current sense network, directly connected to the input node and the phase node, provides the current sense signal.

9. The method of claim 8, wherein the step of providing the RSTB signal operating at the desired switching frequency comprises:

inverting the first clock signal to generate an inverted first clock signal;

delaying the first clock signal to generate a delayed first clock signal;

inputting the inverted first clock signal and the delayed first clock signal into a NOR gate to generate an intermediate LEB signal; and inverting the intermediate LEB signal to generate the RSTB signal operating at the desired switching frequency.

10. The method of claim 8, wherein the step of generating the duty signal based on the error voltage, the sum signal indicative of slope signal, and the second clock signal comprises:

generating a PWM comparator output signal based on comparison of the error voltage and the sum signal; and inputting the PWM comparator output signal and the second clock signal into a latch to generate the duty signal.

* * * * *